Nov. 15, 1932.                C. H. CHAPIN                1,887,709
                        HYDRAULIC SHOCK ABSORBER
                    Filed May 25, 1929        2 Sheets-Sheet 1
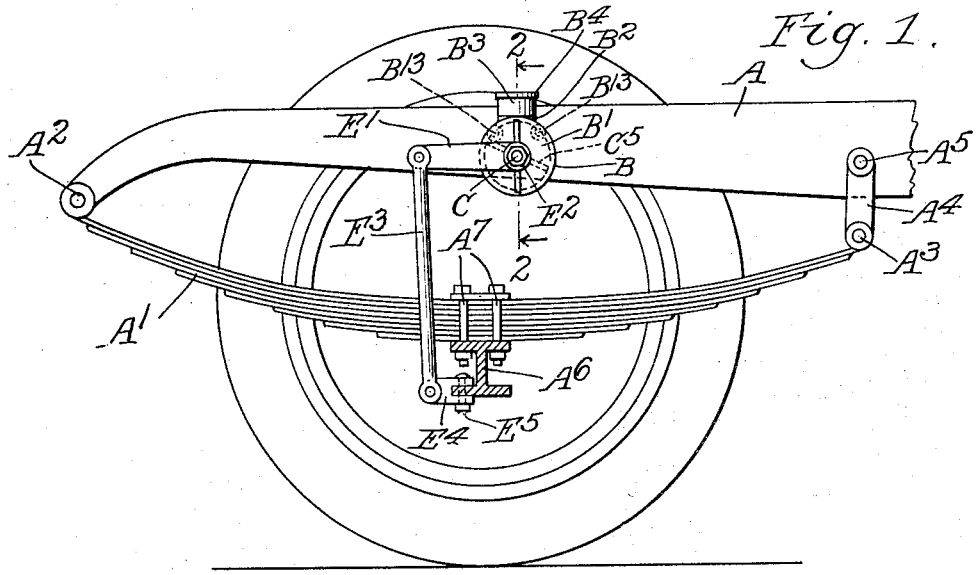
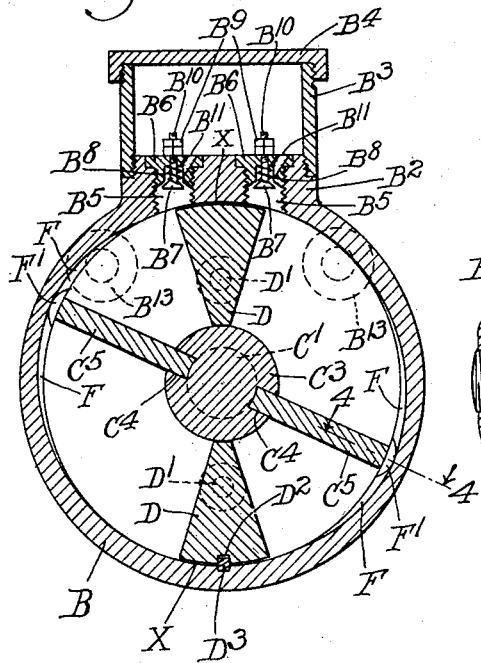
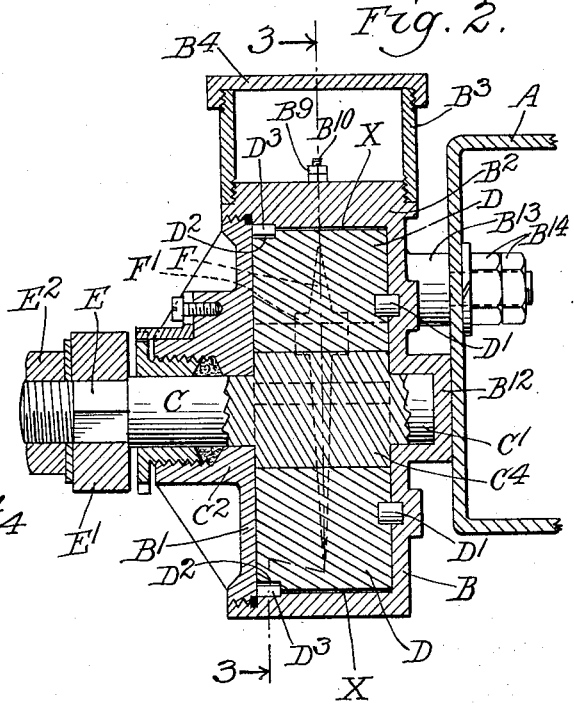
Inventor
Charles H. Chapin
by Parker & Carter
Attorneys.

Nov. 15, 1932. C. H. CHAPIN 1,887,709
HYDRAULIC SHOCK ABSORBER
Filed May 25, 1929   2 Sheets-Sheet 2

Inventor
Charles H. Chapin
by Parker & Carter
Attorneys.

Patented Nov. 15, 1932

1,887,709

UNITED STATES PATENT OFFICE

CHARLES H. CHAPIN, OF CHICAGO, ILLINOIS

HYDRAULIC SHOCK ABSORBER

Application filed May 25, 1929. Serial No. 365,891.

This invention relates to a hydraulic shock absorber. In the form illustrated herewith it is particularly adapted for use in connection with vehicles. One object is to provide means for controlling the relative movement of the vehicle frame or chassis and the wheels, and to provide for such control automatic means for compensating for temperature variations. Another object is to provide such a control which will be equally effective for all road conditions and which will not require special adjustment to compensate for changes in the temperature of the atmosphere. Other objects will appear from time to time in the course of the specification and claims.

The invention is illustrated more or less diagrammatically in the accompanying drawings wherein:

Figure 1 is a side elevation of a part of the automobile frame showing the shock absorber in place;

Figure 2 is a transverse vertical cross section on an enlarged scale taken on line 2—2 of Figure 1;

Figure 3 is a longitudinal vertical cross section taken on line 3—3 of Figure 2;

Like parts are designated by like characters throughout the specification and drawings.

Figure 4:
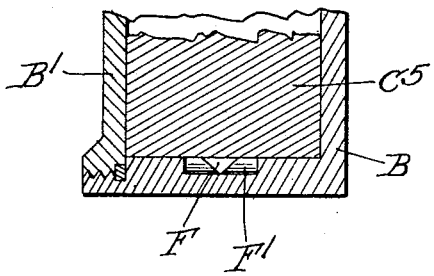
Figure 4 is a detailed sectional view on a further enlarged scale taken on line 4—4 of Figure 3.
Figure 7:
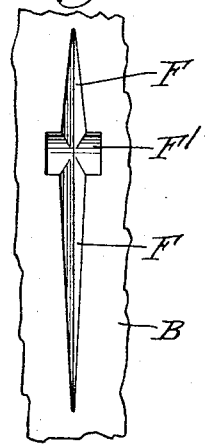
Figure 7 is a projection of the groove on the inside of the shock absorber housing.

A is a part of an automobile frame. $A^1$ is a spring attached to the frame as at $A^2$ and at its other end as at $A^3$ pivotally connected to a link $A^4$ which is itself pivoted on the frame at $A^5$. $A^6$ is an axle supported on the spring by means of attachments $A^7$, $A^7$.

B designates generally a shock absorber housing. It may be cup shaped as shown particularly in Figure 2 and provided with a closing plate $B^1$ which is removably fastened to its open side. Preferably towards its upper part the casing B is provided with a generally rounded enlargement $B^2$ upon which a cylindrical member $B^3$ may be positioned. $B^4$ is a removably mounted cover plate positioned on the cylindrical portion $B^3$. The portion $B^2$ is provided with a pair of interiorly threaded passages $B^5$, $B^5$ communicating with the space inclosed in the housing proper and the interior of the cylindrical portion $B^3$. Valve cages $B^6$, $B^6$ are removably positioned in the upper enlarged ends of the passages $B^5$. Valves $B^7$, $B^7$ are seated in the cages $B^6$ and are normally held in the open position by helical springs $B^8$, $B^8$ which surround the valve stems. $B^9$, $B^9$ are locking nuts fastened on the upper end of the valve stems $B^{10}$ and serve to position and control the adjustment of the valves. $B^{11}$, $B^{11}$ are passages formed in the valve cages and through which fluid may pass to and from the casing proper. The valve casing member B is provided with a bearing containing enlargement $B^{12}$ and one or more enlargements $B^{13}$ which may contact the frame A as shown particularly in Figure 2 and serve to receive attaching means $B^{14}$, which may have a screw, bolt or other suitable member.

Positioned so that it extends into the housing and has one end supported in the member $B^{12}$ is an axle C, the end $C^1$ being supported in the member $B^{12}$. Its other end is supported in a bearing $C^2$ in the cover plate $B^1$. The axle is provided intermediate its ends with an enlargement $C^3$ which has a pair of oppositely placed slots or grooves $C^4$ formed in it within which the paddles $C^5$ are positioned.

D, D are resistors or baffles fitted into the interior of the housing as shown and preferably diametrically opposite each other. Since there is a slight movement of the resistors with relation to the housing, they are pinned in position by means of pins $D^1$, $D^1$ and are provided also with notches $D^2$, $D^2$ into which feathers $D^3$ may fit. The periphery of the housing is also notched to receive the feathers $D^3$. The casing and shaft or axle are preferably made of a material having a low coefficient of expansion and the paddles and resistors or baffles are made of material having a high coefficient of expansion. In this form of the invention the paddles and resistors are made of a zinc alloy and the axle and housing of steel, although these are not the only materials which might be used.

The shaft or axle C is provided with an angularly shaped end E upon which a lever arm $E^1$ is positioned, the lever arm being held in position by a nut $E^2$. Pivoted on the outer end of the lever arm is a link $E^3$ which is pivoted also at its lower end to a member $E^4$ which is fastened by means of a bolt or screw $E^5$ to the axle as shown particularly in Figure 1.

The interior of the housing is provided with a pair of oppositely placed grooves F. The grooves are pointed at each end as indicated particularly in Figure 2 and expand from the end inwardly. Intermediate their ends they are provided with relatively wide and deep pockets $F^1$ and the groove adjacent the pockets has its greatest width.

The resistors being made of material having a relatively high coefficient of expansion, will expand and contract appreciably as the temperature varies. At one temperature there will be practically no space for the escape of fluid past the ends of the resistor and the resistor will thus be in contact at its outer end with the periphery of the housing and at its inner end with the enlarged portion $C^3$ of the shaft or axle C. When the atmosphere cools sufficiently a certain amount of contraction will take place and the resistor will then shrink away, particularly at its outer end, from the inside of the housing and a clearance will thus develop, for example at X. This clearance will develop with a cooling of the temperature and at the same time the fluid within the shock absorber will, as a result of the cooling of the temperature, become more viscous and thus as the fluid becomes more viscous and thicker, a slightly increased clearance is provided so that the shock absorber construction automatically compensates for the change in the consistency of the fluid within it.

Figure 5:
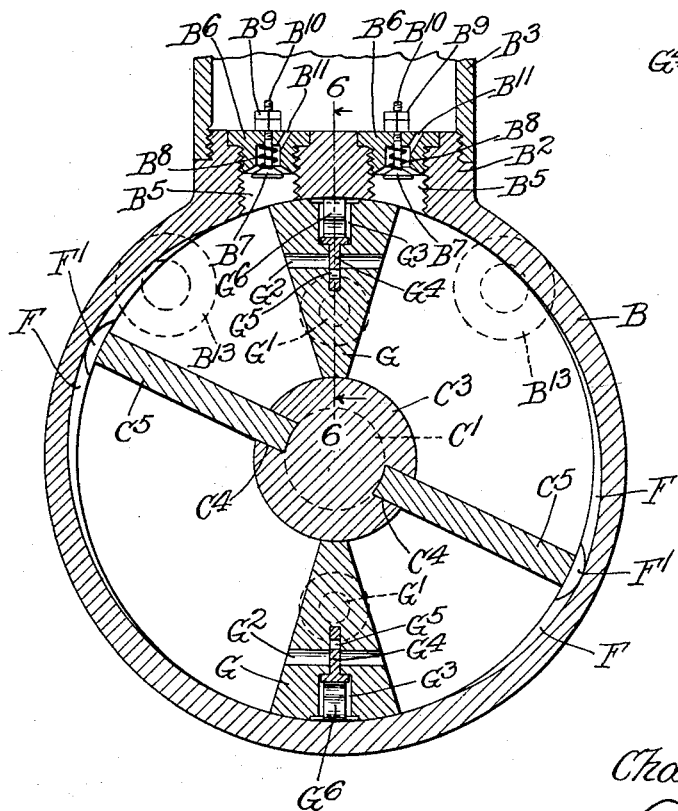
Figure 5 is a view further enlarged, generally similar to Figure 3, showing a modified form.
Figure 6:
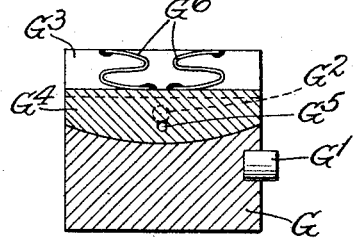
Figure 6 is a detailed sectional view taken on line 6—6 of Figure 5.

There is illustrated in Figures 5 and 6 a modified form. In that form instead of resistors D shown in the earlier figures, resistors G are provided. They are mounted diametrically opposite each other within the housing and are held in place by pins $G^1$ in a manner similar to that described in connection with the earlier form. There is provided through each of the resistors a passage $G^2$. A slot $G^3$ is cut in the outer end of each resistor and within this slot there is positioned a gate member $G^4$ which extends across the opening $G^2$. Each of the gates $G^4$ is provided with a perforation or opening $G^5$ through it. A thermostatic member $G^6$ is mounted within the slot $G^3$ and is adapted by its movement to control the gate. As the temperature of the shock absorber increases, the unit $G^6$ expands and moves the gate into the position shown in Figure 5 in which the opening $G^2$ is closed. As the temperature decreases, the members $G^6$ tend to contract and to move the gate outwardly until the opening $G^5$ of the gate $G^4$ is wholly or partially in register with the opening $G^2$ through the resistor. There is thus provided in this form a means for compensating with respect to temperature changes which operates to the same general end but in a different manner from that shown in the earlier figures.

Obviously I have shown in my invention the operative form, still many changes in size, shape and distribution of parts might be made without departing from the spirit of my invention.

The use and operation of this invention are as follows:

The shock absorber made in either form is assembled on the automobile as shown in Figure 1. The housing is filled with fluid and a part of the interior of the cylindrical member $B^3$ is also filled with fluid so that normally there is fluid not only in the housing, but in the chamber above the housing. If the vehicle now be moved over an uneven part of the road so that the wheel falls into a hollow, the lever arm $E^1$ will be moved downwardly. The first part of this motion will cause very little shaking effect through the shock absorber as the paddles are standing at the widest point of the slot where the resistance to the escape of the fluid past the paddle is at its lowest. The farther the paddle moves, the greater the resistance because as it moves in either direction it moves past the wide pocket $F^1$ and along the constantly narrowing slot or groove F. When the shock absorber is at rest it will stand as shown in Figures 3 and 5. In that position the valves $B^7$ are open. As soon as the paddles are moved so as to create a pressure in either of the chambers, the valve communicating with that chamber is automatically closed in opposition to the movement of the small spring $B^8$. Since the paddles of course move together, a pressure will be created in one side and a suction will be created in the other. Thus neither compartment can remain empty long because in the constant movement of the paddles which occurs when the vehicle is being moved, fluid will inevitably be drawn out of the reservoir in the member $B^3$ and into the interior of the housing. It will be noticed that in whichever direction the lever arm $E^1$ is moved, the paddles are moved from the neutral position opposite the wide and deep pocket $F^1$ to a position farther along the slot or groove F, and as this movement is continued, the paddle moves constantly toward a place where the width of the slot is less, and therefore the opportunity for the escape of the fluid past the edge of the paddle is decreased and resistance to further movement of the paddle is increased.

The housing and shaft are made of material having a low coefficient of expansion so that their size is affected very slightly by even considerable temperature changes. The fluid within the shock absorber is inevitably somewhat affected by temperature changes, and thus the consistency of the fluid and the operation of the shock absorber at 100° F. would be very different from what it would be at 0° F. unless some compensation were provided. It is to provide this compensation that the paddles and the resistors have been made of a material having a high coefficient of expansion. As the temperature decreases and the fluid within the shock absorber becomes thicker, the size of the paddles decreases and thus a greater clearance is provided past the ends of the paddles, the size of the resistors also decreases and thus a slight clearance is provided past the ends of the resistors so that the essential parts of the shock absorber itself are formed of materials having such coefficients of expansion that they themselves automatically change size in response to temperature variations to compensate for the change in consistency and viscosity of the fluid within the shock absorber. Thus by forming some parts of the shock absorber of material having a high coefficient of expansion, this automatic compensation is provided without the necessity of adding any additional thermostatic controlling elements and without the necessity of making any parts in a peculiar shape so as to create or magnify a thermostatic effect and the essential structural parts of the shock absorber themselves furnish the necessary compensation for temperature variations and this compensation is due to the material of which these essential parts are made.

I claim:

1. In a hydraulic shock absorber, a casing adapted to contain a fluid and a member movably mounted within said casing, there being a graduated clearance between the member and the wall of the casing, one of the two members mentioned being formed of a material having a high co-efficient of expansion and the other of a material having a low co-efficient of expansion whereby the clearance between them is varied in response to temperature variations, and a dividing member positioned within the casing to provide a plurality of chambers therein, said dividing member being of a material having a high co-efficient of expansion.

2. In combination in a hydraulic shock absorber, a casing, a plurality of members movably mounted therein, the casing being formed of a material having a low co-efficient of expansion and the movable member being formed of a material having a high co-efficient of expansion, a plurality of dividing members within the casing dividing the same into a plurality of chambers, there being a movable member in each, the dividing members being formed of a material having a high co-efficient of expansion.

3. In combination in a hydraulic shock absorber, a casing, formed of steel, a plurality of relatively fixed dividing members therein adapted to divide the casing into a plurality of chambers, said dividing members formed of zinc, a plurality of movable members mounted one in each of said chambers, and formed of zinc.

4. In combination in a hydraulic shock absorber, a casing, formed of steel, a plurality of relatively fixed dividing members therein adapted to divide the casing into a plurality of chambers, said dividing members formed of zinc, a plurality of movable members mounted one in each of said chambers, and formed of zinc, there being grooves in the wall of said casing adapted to provide clearance past said movable members.

5. In combination in a hydraulic shock absorber, a casing providing a main resistance chamber and reservoir, a movable member mounted within said resistance chamber, a liquid passage between the two chambers, a member controlling said liquid passage and means for holding the same open at all times when the pressure within said resistance chamber is not more than that within said reservoir.

6. In combination in a hydraulic shock absorber, a main casing providing a main resistance chamber and reservoir, a movable member mounted within said main resistance chamber, a liquid passage between the two chambers, a member controlling said liquid passage and means for holding the same open at all times when the pressure within said main chamber is not more than that within reservoir, the movable member formed of a material having a higher co-efficient of expansion than that of the casing.

7. In combination in a hydraulic shock absorber, a main casing providing a main resistance chamber and reservoir, a movable member mounted within said main resistance chamber, a liquid passage between the two chambers, a member controlling said liquid passage and means for holding the same open at all times when the pressure within said main chamber is not more than that within reservoir, a partition within said main chamber, said partition and said movable member formed of material having higher co-efficient of expansion than that of the casing.

Signed at Chicago, county of Cook and State of Illinois, this 23rd day of May, 1929.

CHARLES H. CHAPIN.